United States Patent

Nakai et al.

[11] Patent Number: 5,484,291
[45] Date of Patent: Jan. 16, 1996

[54] APPARATUS AND METHOD OF PLAYING KARAOKE ACCOMPANIMENT

[75] Inventors: Toshiki Nakai; Mitsuyoshi Amano; Kazuhiro Miyamoto; Yoshiyuki Akiba; Masuhiro Sato, all of Tokyo, Japan

[73] Assignee: Pioneer Electronic Corporation, Tokyo, Japan

[21] Appl. No.: 279,523

[22] Filed: Jul. 25, 1994

[30] Foreign Application Priority Data

Jul. 26, 1993 [JP] Japan .................................. 5-184181

[51] Int. Cl.⁶ .................. G09B 5/08; G10H 1/36
[52] U.S. Cl. ................ 434/307 A; 434/318; 84/610; 358/335; 360/33.1
[58] Field of Search ............... 434/307 R, 307 A, 434/308, 309, 318, 365; 84/477 R, 601, 603, 610, 609, 625, 630, 631, 634, 645; 369/48, 178, 192, 2; 360/32, 33.1, 49, 70, 77.01; 358/335; 395/2.79, 154, 160; 345/141, 143, 147; 348/478, 488, 571; 381/51

[56] References Cited

U.S. PATENT DOCUMENTS

| | | | |
|---|---|---|---|
| 5,235,124 | 8/1993 | Okamura et al. | 434/307 A |
| 5,243,123 | 9/1993 | Chaya | 434/307 A |
| 5,247,126 | 9/1993 | Okamura et al. | 434/307 A |
| 5,294,746 | 3/1994 | Tsumura et al. | 434/307 A |
| 5,321,200 | 6/1994 | Yamamoto | 84/645 |

Primary Examiner—Joe H. Cheng
Attorney, Agent, or Firm—Kane, Dalsimer, Sullivan, Kurucz, Levy, Eisele and Richard

[57] ABSTRACT

A karaoke apparatus includes: a karaoke information reproducing unit for reproducing MIDI sound source control information stored in a storage unit; a MIDI sound source control unit for producing first MIDI sound source control information and second MIDI sound source control information from the MIDI sound source control information reproduced by the karaoke information reproducing unit; a first MIDI sound source for producing first karaoke accompaniment information from the first MIDI sound source control information; a second MIDI sound source for producing second karaoke accompaniment information from the second MIDI sound source control information; and a mixing unit for mixing the first karaoke accompaniment information and second karaoke accompaniment information to output mixed karaoke accompaniment information.

11 Claims, 9 Drawing Sheets

FIG.11

1st SOUND SOURCE DATA    9 0 h    0 0 h    0 0 h    6 0 h    6 5 h

2nd SOUND SOURCE DATA    9 0 h    0 0 h    7 8 h    6 0 h    6 5 h

NOTE-ON    TIMING    SCALE    VELOCITY

APPARATUS AND METHOD OF PLAYING KARAOKE ACCOMPANIMENT

BACKGROUND OF THE INVENTION

1. Field of the Invention

This invention relates to so-called karaoke apparatus, and more particularly to karaoke apparatus utilizing MIDI (Musical Instrument Digital Interface) standard.

2. Description of the Prior Art

A conventional karaoke apparatus which plays karaoke music based on MIDI sound source control information according to MIDI standard is shown in FIG. 1. As seen from FIG. 1, user's singing voice is converted into electric signal, serving as acoustic information signal, by microphone 103. Key control signal obtained from input to the microphone is supplied to board computer 101, via interface 104, and to amplifier 107. The board computer 101 receives MIDI sound source control information from MIDI information storage device 102, and this MIDI sound source control information is supplied to MIDI sound source module 106 via an interface (I/F) 105. On receiving the MIDI sound source control information, the MIDI sound module 106 outputs karaoke accompaniment information to the amplifier 107. The amplifier 107 mixes the above mentioned singing voice with the karaoke accompaniment information and outputs it to speaker 108 as acoustic information signal. The speaker 108 generates acoustic sound based on the acoustic information signal thus received. Reference numeral 109 designates picture display system utilizing LD (Laser Disk) as reproduction picture information source. According to display timing data stored in the MIDI information storage device 102, the picture display system 109 displays picture of LD, on a monitor 110, with data such as words-of-song data superimposed on it.

As described above, karaoke apparatus according to MIDI standard obtains Karaoke accompaniment information by utilizing a unique MIDI sound source module. However, in use of a unique sound source module, it is impossible to intermix multiple sounds to create rich or luxuriant sound. In addition, since number of notes of MIDI sound source is limited, various applications of karaoke apparatus that provides additional enjoyments fully utilizing nature of MIDI system, such as additional play of electric instruments according to MIDI standard, cannot be performed.

SUMMARY OF THE INVENTION

It is an object of the present invention to provide karaoke apparatus capable of producing rich sound and providing various performances for additional enjoyment.

Generally, "rich" sound is obtained, even from a unique instrument, in such a manner that reverberations of main sound is added to main sound, higher harmonics and/or ordinary wave are generated, and they are intermixed with each other. When many instruments are played, richness of sound due to individual differences of sounds from plural instruments becomes more remarkable. For example, when same instruments play same notes, such as violins in orchestra, rich sound may be produced because each of the instruments has acoustic characteristics slightly different from each other.

In this view, according to one aspect of the present invention, there is provided a karaoke apparatus including: a karaoke information reproducing unit for reproducing MIDI sound source control information stored in a storage unit; a MIDI sound source control unit for producing first MIDI sound source control information and second MIDI sound source control information from the MIDI sound source control information reproduced by the karaoke information reproducing unit; a first MIDI sound source for producing first karaoke accompaniment information from the first MIDI sound source control information; a second MIDI sound source for producing second karaoke accompaniment information from the second MIDI sound source control information and a mixing unit for mixing the first karaoke accompaniment information and second karaoke accompaniment information to output mixed karaoke accompaniment information.

According to another aspect of the present invention, there is provided a method of playing karaoke accompaniment including the steps of: reproducing first MIDI sound source control information including note data of a plurality of notes and output timing data of the notes from a storage unit; producing second MIDI sound source control information by modifying the output timing data of the notes of the first MIDI sound source control information; producing first karaoke accompaniment information from the first MIDI sound source control information; producing second karaoke accompaniment information from the second MIDI sound source control information; and mixing the first karaoke accompaniment information and second karaoke accompaniment information in accordance with the output timing data of the notes in the first and second MIDI sound source control information.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 11 is a diagram illustrating examples of MIDI karaoke data according to the second embodiment of the present invention.

DESCRIPTION OF THE PREFERRED EMBODIMENT

Prior to description of preferred embodiments of the present invention, details of MIDI standard, MIDI sound source and MIDI karaoke file are described.

MIDI standard and MIDI sound source:

MIDI (Musical Instrument Digital Interface) is a standard established for exchanging music play information between musical instruments such as synthesizer or electronic piano connected with each other. Electronic instruments having functions of transmitting and receiving MIDI signal, serving as musical instruments control signal for defining various musical information according to MIDI standard, are generally called as "MIDI equipments".

As to communication format of MIDI standard, MIDI signal is serial data of transfer rate 31.25 [Kbaud (=1000 bps)] and is transmitted by nonsynchronous serial transmission. One byte data of MIDI signal consists of 10 bits data including 8 bits for data, 1 bit for start bit and 1 bit for stop bit. As to data format in use, one status byte and one or two data bytes are used in combination. Status byte indicates kinds of transferred data and MIDI channels, and data byte consists of musical information introduced by status byte. They are combined to form a men, sage serving as musical information. Accordingly, one message generally consists of 1 to 3 bytes, and transfer time of one message ranges from 320 to 960 [μsec]. MIDI channels indicate sound sources, i.e., notes of instruments, and one note of one instrument is assigned to one MIDI channel. By transmitting this successive messages, acoustic sound is produced.

Figure 1:
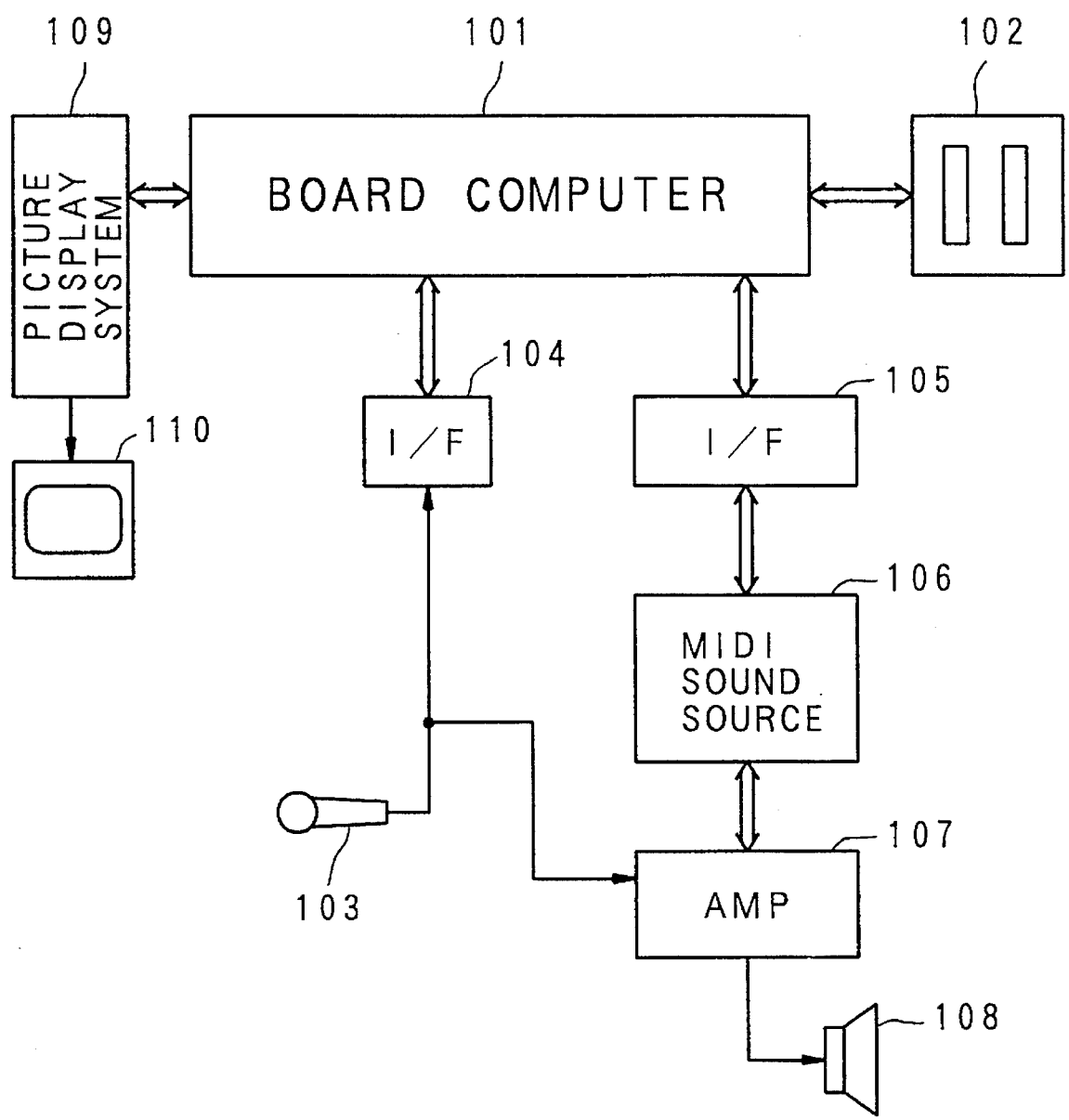
FIG. 1 is a block diagram illustrating construction of a conventional karaoke apparatus according to MIDI standard.
Figure 2:
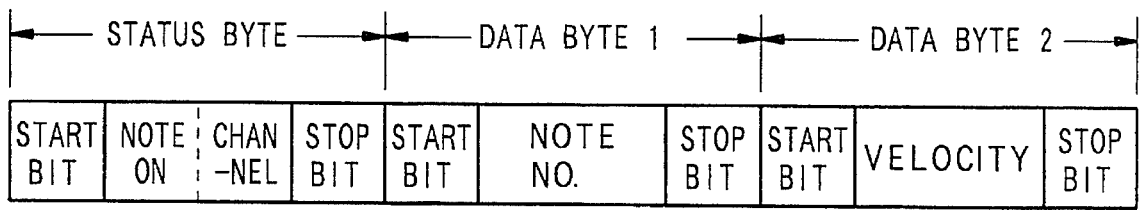
FIG. 2 illustrates an example of data format according to MIDI standard.
Figure 3:
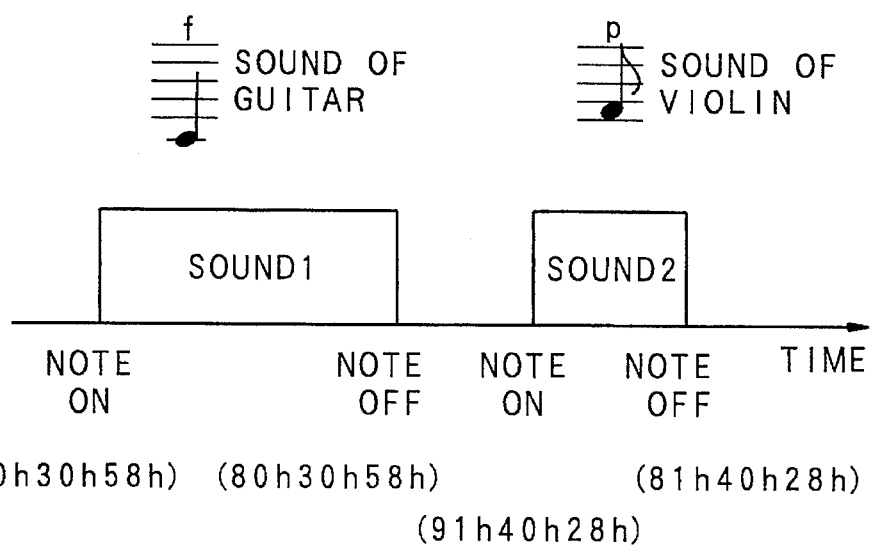
FIG. 3 schematically illustrates a manner of producing sound from MIDI data.
Figure 4:
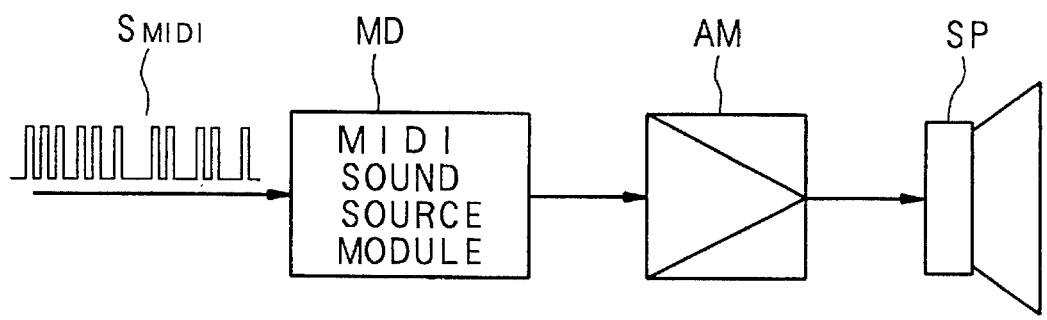
FIG. 4 illustrates manner of producing sound by MIDI sound source module.

Constitution of note-on message, which is one of channel voice message, will be described with reference to FIG. 2, as an example. The note-on message in the status byte corresponds to operation of depressing a key of keyboard, for example, and is used in pair with note-off message which corresponds to operation of releasing the depressed key of keyboard. This is illustrated in FIG. 3. Note-on message is expressed by "90h" (h:hexadecimal digit), and note-off message is expressed by "80h". Channel designates one of sixteen notes assigned to "0h–Fh". Note number in the data byte 1 designates one of 128 stages (0h–7Fh) of pitches which are assigned to 88 keys of piano in a manner that the center key of 88-key piano corresponds to the center of the 128 stages (0h–7Fh) of pitches. Velocity in data byte 2 designates one of 128 stages of sound intensity (volume). When supplied with note-on message, MIDI equipment produces note of designated pitch with designated intensity, like sound produced by a key of keyboard, for example. In addition, when supplied with note-off message, MIDI equipment performs operation equivalent to releasing the depressed key of keyboard. In this manner, MIDI equipment can produce sounds 1 and 2, shown in FIG. 3, having different notes, intensities and time-lengths. When channel of sound source is altered, note of different instrument can be produced. FIG. 3 illustrates an example in which MIDI data relating to guitar sound corresponding to channel "0" and violin sound corresponding to channel "1" are transmitted, and the sounds are produced. Sound 1 is produced by transmitting note-on message of channel "0", length of quarter note, scale of C and intensity of forte (f.), and then terminating the production by note-off message. Sound 2 is produced by transmitting note-on message of channel "1", length of eighth note, scale of F and intensity of piano (p.), and then terminating the production by note-off message. Therefore, when MIDI sound source module MD, amplifier AM and speaker SP are used in place of electronic instruments, as shown in FIG. 3, desired sound can be produced by transmitting MIDI data $S_{MIDI}$.

Figure 5:
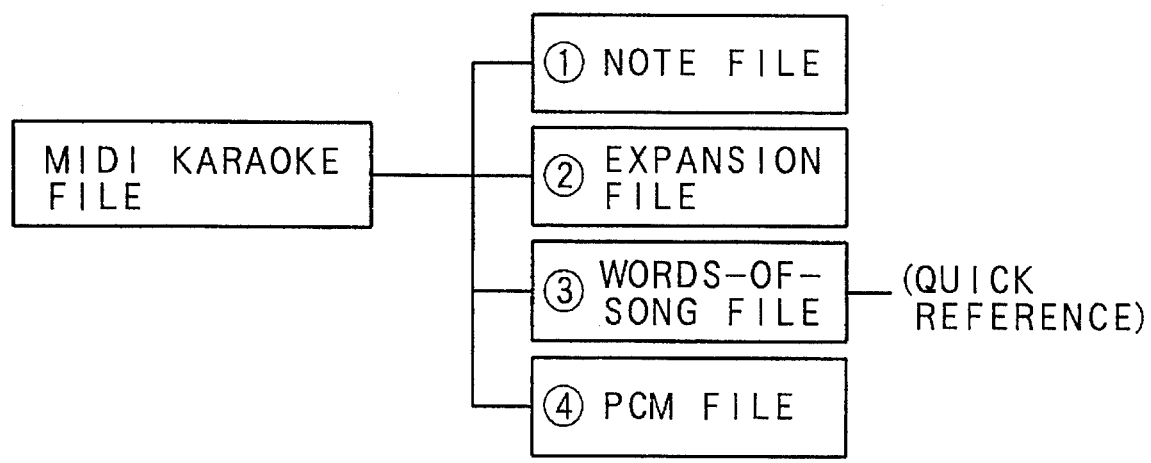
FIG. 5 schematically illustrates constitution of MIDI karaoke file.
Figure 6:
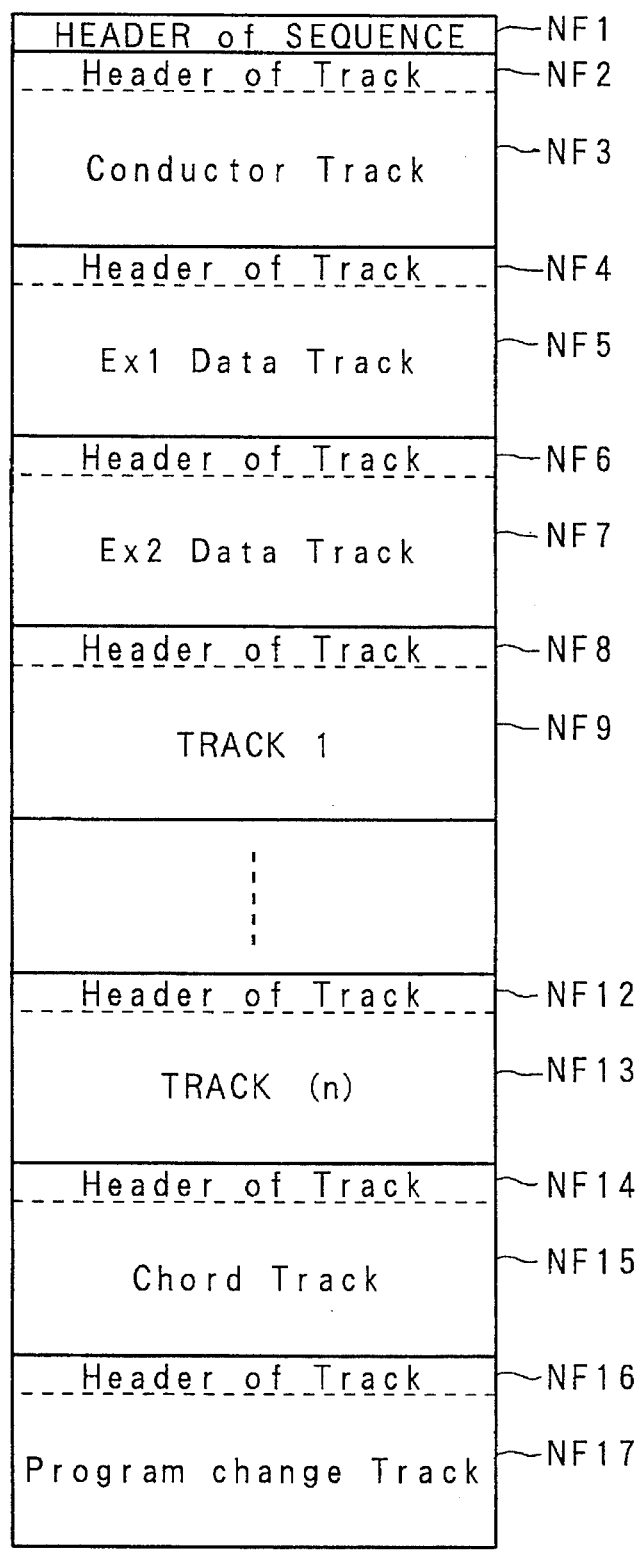
FIG. 6 illustrates data format of note file.

MIDI karaoke file according to MIDI standard:

MIDI karaoke file is information file designed for controlling karaoke apparatus according to MIDI standard, and is stored in MIDI information storage unit. Referring to FIGS. 5 and 6, constitution of MIDI karaoke file will be described. FIG. 5 illustrates rough distribution of MIDI karaoke file. As illustrated, MIDI karaoke file includes note file, extension file, words-of-song file and PCM file. Note file includes musical information for controlling MIDI sound sources. The present invention mainly relates to information of this note file. Words-of-song file includes quick reference data for retrieval, words-of-song data indicating words-of-song and timing map used for changing color of words-of-song displayed during karaoke music play. PCM file includes PCM data for producing and transmitting sounds other than musical information stored in note file, such as sound effects, utilizing PCM decoder.

Next, detail of note file, which is main portion of musical information, will be described with reference to FIG. 6. Note file NF stores actual play data and includes data areas NF1–NF17. Conductor track NF3 stores data for setting rhythm and tempo of music, and tempo change information is stored in this data area. EX data track NF5 stores additional information. NF8–NF13 are named note track, and 32 tracks can be used at maximum. Note track stores data for controlling MIDI sound source. Generally, MIDI sound source module includes 16 channels, and corresponds to MIDI channels of two systems. As to channel bytes in track headers, 00h–0Fh correspond to notes of 1ch–16ch in first system, and 10h–1Fh correspond to notes of 17ch–32ch in second system. Code track NF15 indicates code progress of music, and program change track NF17 is used for changing melody.

Next, preferred embodiments of the present invention will be described with reference to the accompanying drawings.

Figure 7:
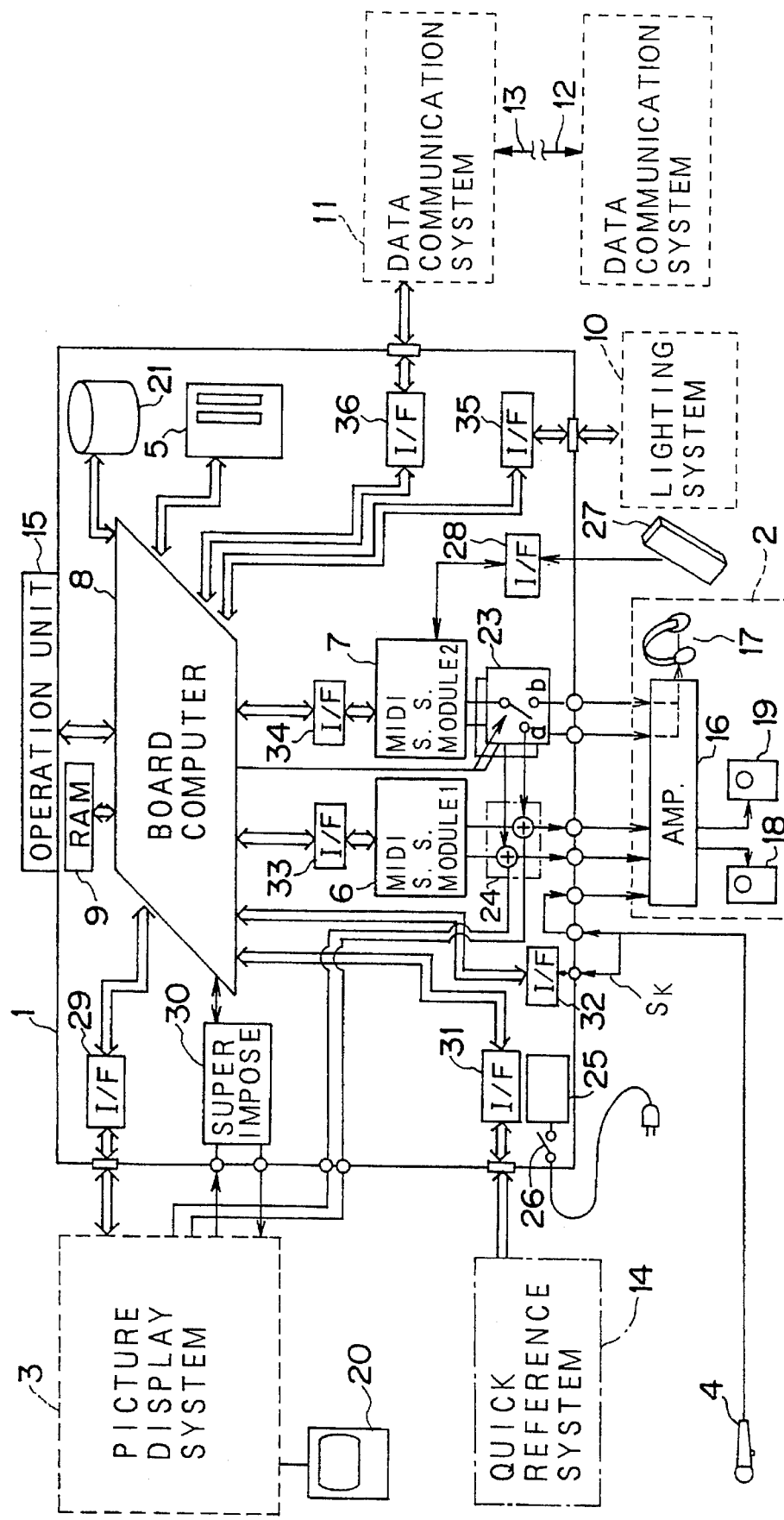
FIG. 7 is a block diagram illustrating construction of karaoke apparatus according to embodiments of the present invention.

1st Embodiment:

A karaoke apparatus according to an embodiment of the present invention is shown in FIG. 7. As illustrated, MIDI karaoke apparatus according to the embodiment includes MIDI control device 1, acoustic sound output system 2, picture display system 3, microphone 4 serving as acoustic-electric converter, lighting system 10, quick reference system 14, data communication system 11, data communication system 12 connected to the data communication system 11 via telephone line 13. The MIDI control device 1 includes an OMDD (Optical Memory Disk Drive) 5, a couple of MIDI sound source modules 6 and 7, board computer 8, operation unit 15, storage unit 21 such as hard disk for storing control program of the board computer 8, RAM (Random Access Memory) 9 for temporarily storing MIDI data, switcher 23, mixer 24, power supply 25, power supply switch 26, superimposition circuit 30 and interfaces 28–36.

The mixer 24 mixes output of the MIDI sound source module 6, output of the MIDI sound source module 7 selected by the switcher 23 and audio signal from the picture display system 3. The acoustic sound output system 2 includes amplifier 16, headphone 17, speakers 18 and 19. The picture display system 3 includes LD player, video effector and camera which are not shown, and monitor 20 is connected to the picture display system 3. The quick reference system 14 includes user-seat terminal, reserved-song display, MIDI sound source module and headphone which are not shown, and is used for assisting user's karaoke song selection. The lighting system 10 includes lighting controller, driver and lighting device which are not shown, and controls the lighting device in accordance with lighting control information included in MIDI karaoke file. The data communication system 11 includes microcomputer, memory unit, modem which are not shown, and transmits communication information between the data communication system 12 serving as information center and the MIDI control device 1 using the telephone line 13.

Next, basic operation of MIDI karaoke apparatus will be briefly described. It is now assumed that movable contact of the switcher 23 is connected to the a-terminal side.

STEP 1: The quick reference file in MIDI karaoke data is read out from the OMDD 5, and is stored in the RAM 9. The quick reference file is transmitted to the quick reference system 14 and displayed on the monitor. User retrieves desired song by referring to the quick reference data displayed and using operation unit 15, and requests desired song.

STEP 2: The board computer 8 reads out MIDI karaoke file of the song from the OMDD 5, and stores it in the RAM 9.

STEP 3: Information designating background picture in the quick reference file is transmitted to the laser disk player in the picture display system 3, and corresponding picture is reproduced. When the picture appears on the monitor, music is started.

STEP 4: The board computer 8 reads out note file data from the RAM 9, and transmits it to the MIDI sound source module 6 as first sound source data. The MIDI sound source module 6 transmits karaoke accompaniment information to the mixer 24.

STEP 5: According to the flowchart of FIG. 8, MIDI information for the MIDI sound source module 7 is generated and is transmitted to the MIDI sound source module 7 as second sound source data. The MIDI sound source module 7 produces and transmits karaoke accompaniment information to the switcher 23.

STEP 6: The switcher 23 is connected to the a-terminal side in this embodiment, and therefore the karaoke accompaniment information from the MIDI sound source module 7 is supplied to the mixer 24.

STEP 7: In synchronous with the karaoke accompaniment information, PCM file data is read out from the OMDD 5, converted into audio signal by D/A converter (not shown) and supplied to the mixer 24.

STEP 8: Sound mixed by the mixer 24 is supplied to the amplifier 16, and acoustic sound is output from the speakers 18 and 19.

STEP 10: The board computer 8 reads out words-of-song file data in synchronous with the output of audio signal including MIDI signal and PCM signal, converts it to graphic signal and transmits it to the superimpose circuit 30. The superimposition circuit 30 superimposes the graphic signal on the video signal supplied from the laser disk player, and transmits it to the monitor 20.

STEP 11: User sees words-of-song displayed on the monitor 20 and sings karaoke songs using the microphone 4.

STEP 12: As to supply of new tunes, the data communication system 11 receives MIDI data of new tunes from the data communication system 12 via the telephone line 13. The MIDI data of new tunes are then transmitted to the board computer 8 to be stored in the OMDD 5.

Figure 8:
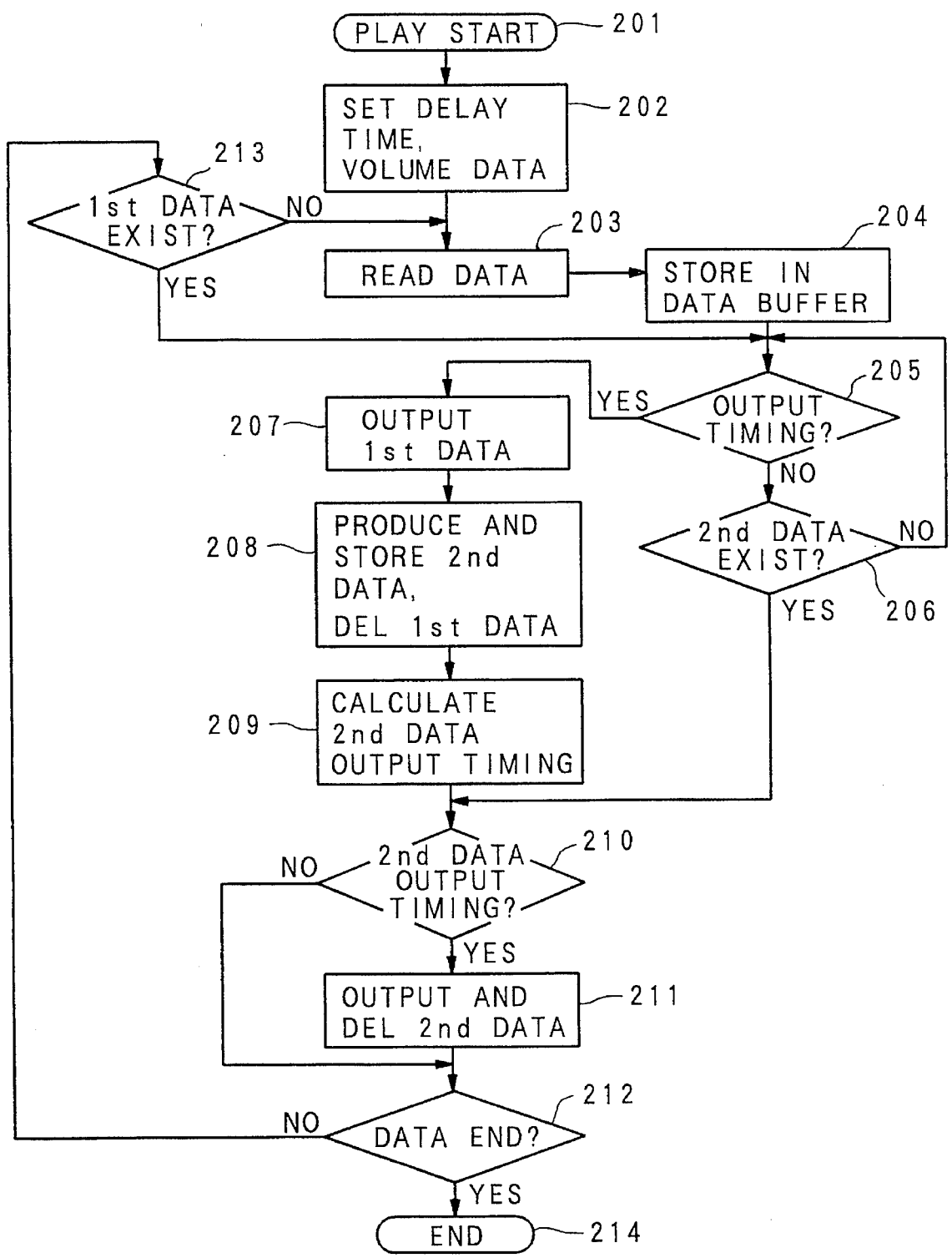
FIG. 8 is a flowchart illustrating operation of sound sources according to first embodiment of the present invention.

Next, operation of the STEPs 4 to 6 will be described in more detail with reference to FIG. 8. Processing shown in FIG. 8 is to produce delay time for MIDI data of every notes by software, to transmit original MIDI data to the first MIDI sound source module 6 and to transmit modified MIDI data to the second MIDI sound source module 7 with the delay time. Now, it is supposed that the processing starts from the condition where the STEP 3 described above is completed (step 201). The board computer 8 refers to note file data relating to the requested song which has been read out from the OMDD 5 and stored in the RAM 9 according to the STEP 2, sets delay time, volume, etc., used in the second MIDI sound source module 7, for every parts of the tracks such as rhythm, bass, melody, and stores them in the RAM 9 as supplemental parameters of each tracks (step 202). Then, note files are successively read from first note in play order (step 203) and stored in a data buffer for first sound source (hereinafter referred to as "first buffer") as first sound source data (step 204). When output timing comes (step 205), the first MIDI sound source module 6 is supplied with first sound source data and outputs musical information in line with the first sound source data (i.e., the original MIDI information in the note file) (step 207). Here, until the output timing comes, the board computer 8 monitors the data buffer for second sound source (hereinafter referred to as "second buffer") to discriminate whether second sound source data corresponding to the first sound source data is present or not (step 206), and confirms output timing of the second sound source data if it is present (step 210). At this stage, the board computer 8 simply waits for the output timing of first sound source data because it is first note of the first sound source data and second sound source data has not been produced yet. Then, the board computer 8 produces second sound source data on the basis of first sound source in the first buffer and the supplemental parameters relating to the delay time and volume, produced in step 202, and stores the produced second sound source data in the second buffer. Then, the board computer 8 deletes the data of the first buffer (step 208). Subsequently, the board computer 8 calculates output timing of the second sound source data (step 209), .and waits for the output timing (step 210). If the output timing comes, the board computer 8 outputs the second sound source data, and deletes the data of the second buffer (step 211). In this case, if a plurality of second sound source data are stored in the second buffer, the above operation is executed for first data. If the output timing has not come yet in step 210, the process proceeds to step 212. If all data are not output, in step 212, the board computer 8 confirms contents of the first buffer (step 213), and goes to step 203 if no data exists in the first buffer. If data exists in the first buffer, the process goes to step 205. In this way, the board computer 8 needs to confirm the priority to output the data in correct order by referring to output timing data of every notes. When all data are output, music play ends (step 214).

In the first embodiment described above, when one first sound source data is transmitted, second sound source data is immediately produced on the basis of the supplemental parameters set in advance and output with appropriate delay time. Since the switcher 23 is connected to a-terminal side, outputs of the first MIDI sound source module 6 and the second MIDI sound source module 7 are mixed by the mixer 24. The mixed data is supplied to the amplifier 16 and then output from the speakers 18 and 19 as acoustic sound.

Figure 9A:
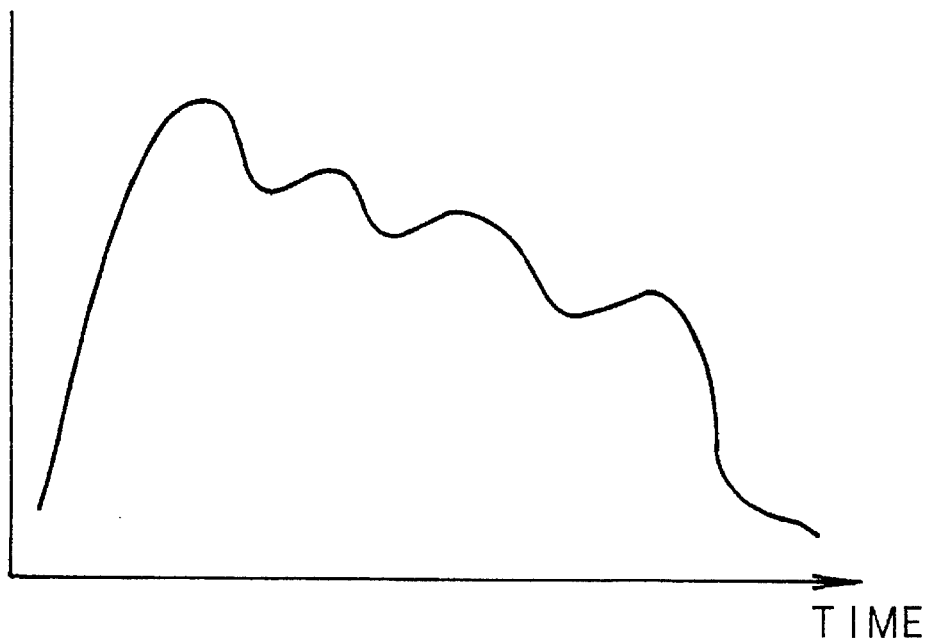
FIGS. 9A and 9B are diagrams illustrating waveforms of acoustic signals for explaining richness of sound.
Figure 9B:
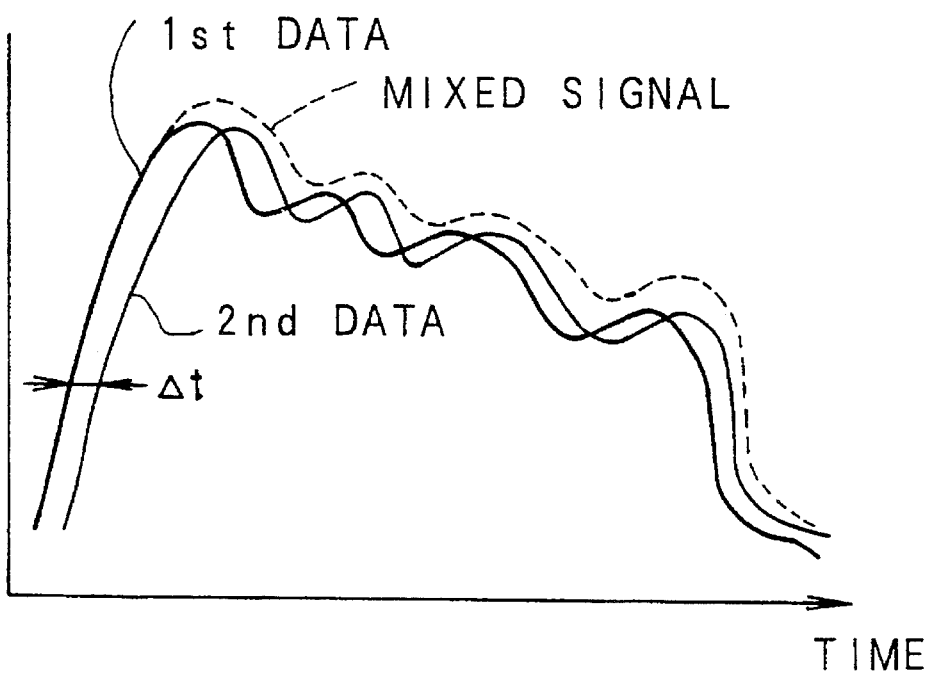

Effect of this operation will be described with reference to FIGS. 9A and 9B. Waveform shown in FIG. 9A is of original sound produced by the first MIDI sound source module 6. Here, if identical data is supplied to sound source of same note in other channel of the first MIDI sound source module, MIDI sound source produces same sound because the data supplied is identical. Therefore, waveform of output sound is identical to the waveform shown in FIG. 9A, and it does not contributes to the creation of rich sound. On the other hand, if data is output from the second sound source with delay time Δt as shown in FIG. 9B, sound from two sound sources are intermixed and waveform of output sound shown by the dotted line in FIG. 9B is obtained. This is perceived as richness of sound. FIG. 9B is directed to a simple case where the second sound source data is of the same volume and same frequency as the first sound source data (i.e., the original data). However, second sound source data may be produced by increasing or decreasing volume of original sound to vary reverberation characteristics or by using second or third harmonics of original sound, thereby creating rich sound of various types. In this respect, it is of course possible to utilize effector or DSP (Digital Sound Processor) to obtain similar effect. However, it requires exclusive device and it is difficult to precisely change various conditions such as delay time, volume of delayed data or pitches, for every notes of every sound sources. In this view, this invention is more effective and broadly applicable.

As described above, according to the first embodiment, since second sound source data is produced from original note file data of 16 channels by calculation, it is possible to readily create rich sound from karaoke data conventionally used.

2nd Embodiment:

Karaoke apparatus according to second embodiment will be described with reference to FIG. 7. In the first embodiment, second sound source data is produced on the basis of the original MIDI data by software. However, according to the second embodiment, MIDI data for 17–32 channels are prepared beforehand in note file, in addition to the first sound source data for 1–16 channels, and each the second sound source data is output at appropriate output timing. The second embodiment is same as the first embodiment in its construction.

Figure 10:
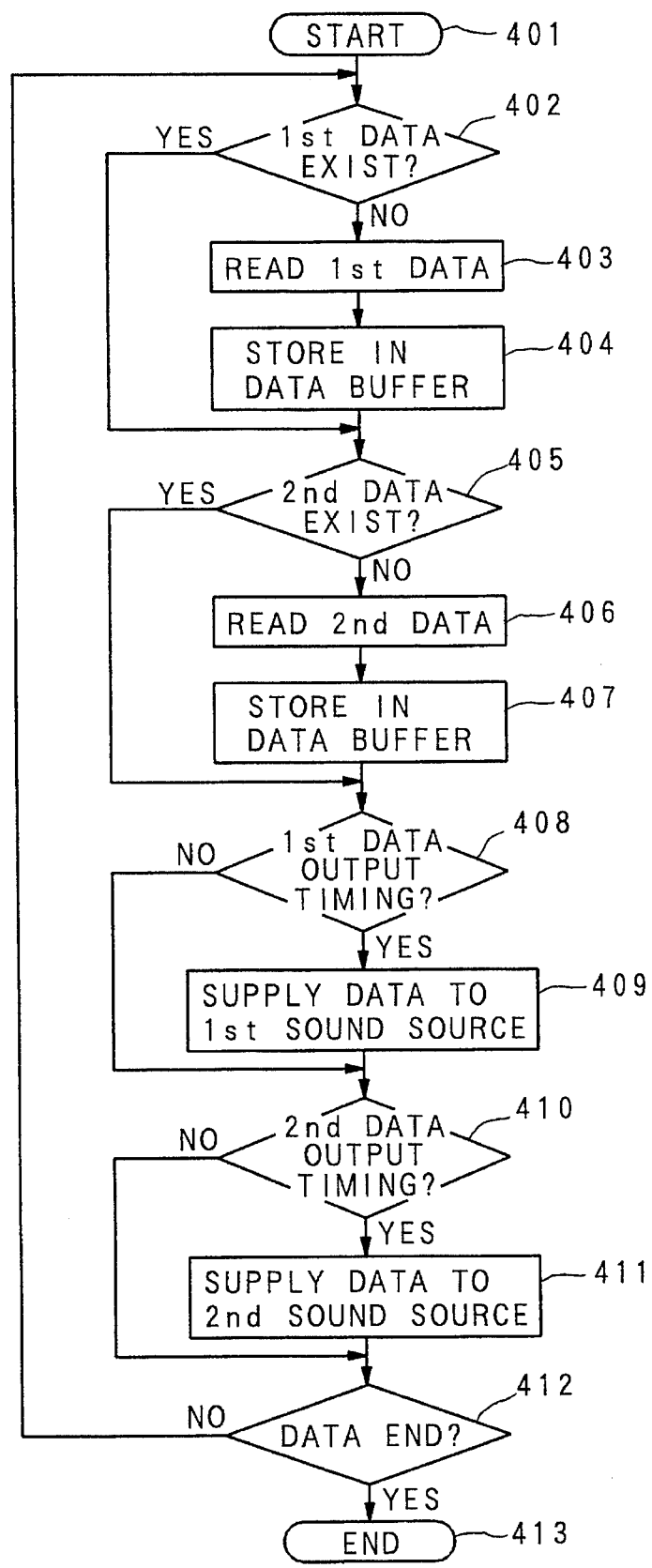
FIG. 10 is a flowchart illustrating operation of sound sources according to second embodiment of the present invention.

Operation of the second embodiment will be described with reference to the flowchart of FIG. 10. In FIG. 10, starting step 401 is a stage where STEP 3 in the basic operation of first embodiment is completed. Firstly, the board computer 8 detects whether first sound source data are present in the RAM 9 or not (step 402). If first sound source data are not present (step 402:NO), the board computer 8 reads out first sound source data of the requested song, which is MIDI data for channels 1–16, from the OMDD 5 (step 403), and stores them in the RAM 9 (step 404). Subsequently, the board computer 8 detects whether second sound source data, that is, MIDI data for channels 17–32, are present in the RAM 9 or not (step 405), and if they are present, the process jumps to step 408. If second sound source data are not present (step 405: NO), the board computer 8 reads out second sound source data from the OMDD 5 (step 406), and stores them in the RAM 9 (step 407).

When karaoke play is started, the board computer 8 serving as sound source control means firstly discriminates whether output timing of first sound source data comes or not (step 408). If the output timing comes (step 408:YES), the board computer 8 transmits the data to the first MIDI sound source module 6 (step 409) so that related music accompaniment information is supplied to the mixer 24. If output timing does not come (step 408: NO), the process jumps to step 410. Subsequently, the board computer 8 executes similar operation as the above to the second sound source data. Namely, the board computer 8 discriminates whether output timing comes or not (step 410), and if the output timing comes (step 410:YES), the board computer 8 transmits the second sound source data to the second MIDI sound source module 7 (step 411). If output timing has not come yet (step 410:NO), the board computer 8 discriminates whether all data are read or not (step 412). If subsequent data or buffer data are present (step 412:NO), the process returns to step 402 to execute the same operation for next note. If all data are read (step 412:YES), processing relating to this embodiment ends (step 413).

In the above described operation, musical information output from the first MIDI sound Source module 6 and the second MIDI sound source module 7 are supplied to the mixer 24 to be mixed with each other because the switcher 23 is connected to the a-terminal side, The mixed signal is further mixed, by the amplifier 16, with voice information input to the microphone 4 by user, and then converted into acoustic sound to be output from the speakers 18 and 19.

Examples of data relating to richness of sound which is prepared in the second embodiment will be described with reference to FIG. 11. For the sake of brevity, the following description is directed to the case where the second sound source data to be mixed is produced by simply delaying the first sound source data with the delay time $\Delta t$. As to the play condition, the following description relates to data of tempo 120, resolution 480, and four-four time. Where first sound source data and second sound source data are as shown in FIG. 11, difference $\Delta t$ of output timings between the first sound source data and the second sound source data is 78h. Here, $$78h = 120 \text{ clocks} \qquad (1).$$

Namely, delay time $\Delta t$ corresponds to time length of 120 clocks. Resolution 480 means that a quarter tone corresponds to time length of 480 clocks, and, $$120 \text{ clocks}/480 \text{ clocks} = \tfrac{1}{4} \qquad (2).$$

Namely, the delay time $\Delta t$ is time length of quarter of quarter tone. Additionally, since the tempo is 120, time length of a quarter tone is:

$$60 \text{ sec.}/120 = 0.5 \text{ sec.} \qquad (3).$$

Accordingly, $$0.5 \text{ sec.} \times \tfrac{1}{4} = 125 \text{ msec.} \qquad (4).$$

Namely, the second sound source data is output with delay time of 125 msec. It is very difficult to achieve this delay time by known technique.

As described above, the second embodiment can produce rich sound like the first embodiment. Particularly, the second embodiment can achieve the same effect simply by transmitting second sound source data prepared in advance, and this is advantageous in reducing operation time compared with the first embodiment. Namely, the second embodiment is especially advantageous in the case where second sound source data cannot readily produced by real time calculation of software from first sound source data, for example, where second sound source data should include high harmonics or have very short delay time.

3rd Embodiment:

Next, third embodiment of the present invention will be described with reference to FIG. 7. This embodiment is same as the first embodiment in construction. It is assumed that MIDI karaoke file corresponding to two sound sources and including a plurality of note information are stored in the OMDD 5. This note file is read out from the OMDD 5, and MIDI data for channels 1–16 are transmitted to the first MIDI sound source module 6 while MIDI data for channels 17–32 are transmitted to the second MIDI sound source module 7. By this construction, musical information mixed by the mixer 24 includes note information for 32 channels in total, and this musical information is transmitted to the speakers 18 and 19 via amplifier 16 and converted into acoustic sound by the speakers 18 and 19. A conventional karaoke apparatus produces sounds of 16 kinds of instruments corresponding to channels 1–16 because sound source module is only one. However, there is karaoke music using many instruments and requires different note information more than 16 channels. In such a case, some of notes are omitted and not generated in conventional apparatus. According to the third embodiment, the apparatus can produce sound that are omitted by conventional apparatus due to limitation of channel number. Therefore, production of music software is released from limitation of channel number to relatively small 16 channels, thereby musical enjoyment of MIDI karaoke is improved.

4th Embodiment:

Next, fourth embodiment of the present invention will be described with reference to FIG. 7. This embodiment is same as the first embodiment in its construction. As shown in FIG. 7, instrument 27 according to MIDI standard (MIDI equipment) is connected to the interface 28 in the MIDI control device 1. As MIDI sound source module 7, module capable of handling MIDI data not only supplied from the board computer 8 but from external device is used.

In the above construction, when user plays the instrument 27, MIDI data of the played music is input to the MIDI sound source module 7 via the interface 28. The MIDI sound source module 7 outputs musical information of note designated by the MIDI instrument 27 on the basis of the MIDI data supplied. Simultaneously, the MIDI sound source module 6 receives MIDI data for karaoke accompaniment from the board computer 8 and produces musical information corresponding to the data. In this manner, the MIDI sound source modules 6 and 7 produce musical accompaniment information of notes corresponding to each modules, and produced information are supplied to the mixer 24 so that musical information of accompaniment music and MIDI instrument 27 are mixed. The mixed information is supplied to the speakers 18 and 19 via the amplifier 16 to be output as acoustic sound.

As described above, according to the fourth embodiment, user playing instrument can join in karaoke play. Particularly, even in use of inexpensive instrument which has MIDI output terminal but has no MIDI sound source, user can play karaoke using desired notes prepared in the MIDI karaoke device. Therefore, variety and enjoyment of karaoke play is improved, and the karaoke apparatus may be used for exercise of instruments.

5th Embodiment:

Next, fifth embodiment of the present invention will be described with reference to FIG. 7. This embodiment is same as the first embodiment in its construction. However, in FIG. 7, the switcher 23 is connected to b-terminal side. In this construction, musical information output from the second MIDI sound source module 7 is not mixed by the mixer 24 but separately supplied to another circuit in the amplifier 16. The output of the amplifier 16 is supplied to acoustic device for monitoring such as headphone 17.

According to the above construction, the first MIDI sound source module 6 plays karaoke music while the second MIDI sound source module 7 outputs MIDI information of some note tracks relating to melody, harmony, etc., in note file. Note tracks to be distributed to the second MIDI sound source module 7 may be arbitrarily selected by user using the instruction unit 15. Namely, if user selects note tracks relating to melody, he can listen to only the melody of karaoke song by the headphone 17. Alternatively, if the external MIDI instrument 27 is connected and user selects note track relating to the MIDI equipment, he can listen to his play of the instrument 27.

As described above, according to the fifth embodiment, user can exercise song or harmony without being disturbed by sound of other instruments if he listens to only main melody or harmony of karaoke song using the headphone 17. Further, user can effectively exercise instrument play by listening to sound of instrument that he plays, referred in the fourth embodiment, with sound of music part that user desires to exercise.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A karaoke apparatus comprising:

a karaoke information reproducing unit for reproducing MIDI sound source control information stored in a storage unit;

a MIDI sound source control unit for producing first MIDI sound source control information and second MIDI sound source control information from the MIDI sound source control information reproduced by the karaoke information reproducing unit;

a first MIDI sound source for producing first karaoke accompaniment information from the first MIDI sound source control information;

a second MIDI sound source for producing second karaoke accompaniment information from the second MIDI sound source control information; and a mixing unit for mixing the first karaoke accompaniment information and second karaoke accompaniment information to output mixed karaoke accompaniment information.

2. A karaoke apparatus according to claim 1, further comprising output unit for converting the mixed karaoke accompaniment information into acoustic sound and outputting the acoustic sound.

3. A karaoke apparatus according to claims 1, wherein said second MIDI sound source control unit produces the second MIDI sound source control information by delaying the first MIDI sound source control information.

4. A karaoke apparatus according to claim 3, wherein said MIDI sound source control unit produces the second MIDI sound source control information by changing volume data of the first MIDI sound source control information.

5. A karaoke apparatus according to claim 1, wherein said MIDI sound source control information include note data of a plurality of notes and output timing data of the notes, and said MIDI sound source control unit modifies the output timing data of the first MIDI sound source control information to produce second MIDI sound source control information.

6. A karaoke apparatus according to claim 5, wherein said mixing unit mixes the first MIDI sound source control information and the second MIDI sound source control information in accordance with the output timings of the notes defined in the first and second MIDI sound source control information.

7. A karaoke apparatus according to claim 1, wherein said storage unit stores the first MIDI sound source control information and the second MIDI sound source control information.

8. A karaoke apparatus according to claim 1, wherein said MIDI sound source control unit receives the second MIDI sound source control information from an external MIDI equipment.

9. A karaoke apparatus according to claim 1, wherein said MIDI sound source control unit selects a part of note data of the MIDI sound source control information to produce second MIDI sound source control information.

10. A method of playing karaoke accompaniment comprising the steps of:

reproducing first MIDI sound source control information including note data of a plurality of notes and output timing data of the notes from a storage unit;

producing second MIDI sound source control information by modifying the output timing data of the first MIDI sound source control information;

producing first karaoke accompaniment information from the first MIDI sound source control information;

producing second karaoke accompaniment information from the second MIDI sound source control information; and mixing the first karaoke accompaniment information and second karaoke accompaniment information in accordance with the output timing data of the notes in the first and second MIDI sound source control information.

11. A method according to claim 10, further comprising the step of converting the mixed karaoke accompaniment information into acoustic sound and outputting the acoustic sound.

* * * * *